(12) United States Patent
Ni et al.

(10) Patent No.: US 11,940,680 B2
(45) Date of Patent: Mar. 26, 2024

(54) DISPLAY PANEL AND DISPLAY MODULE

(71) Applicant: Shenzhen China Star Optoelectronics Semiconductor Display Technology Co., Ltd., Shenzhen (CN)

(72) Inventors: Mingming Ni, Shenzhen (CN); Haotian Xu, Shenzhen (CN); Zhiqing Shi, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/973,490

(22) PCT Filed: Nov. 23, 2020

(86) PCT No.: PCT/CN2020/130883
§ 371 (c)(1),
(2) Date: Dec. 9, 2020

(87) PCT Pub. No.: WO2022/077709
PCT Pub. Date: Apr. 21, 2022

(65) Prior Publication Data
US 2023/0236447 A1    Jul. 27, 2023

(30) Foreign Application Priority Data

Oct. 15, 2020   (CN) .......................... 202011101323.1

(51) Int. Cl.
*G02F 1/1334* (2006.01)
*F21V 8/00* (2006.01)
(Continued)

(52) U.S. Cl.
CPC ......... *G02F 1/1323* (2013.01); *G02B 6/0051* (2013.01); *G02F 1/1334* (2013.01);
(Continued)

(58) Field of Classification Search
CPC .............. G02F 1/1323; G02F 1/1334; G02F 1/133512; G02F 1/134309; G02F 1/13476; G02F 2201/50; G02B 6/0051
See application file for complete search history.

(56) References Cited

U.S. PATENT DOCUMENTS

2007/0268427 A1   11/2007   Uehara
2017/0269401 A1    9/2017   Qin et al.
(Continued)

FOREIGN PATENT DOCUMENTS

CN    105223725 A    1/2016
CN    105549236 A    5/2016
(Continued)

OTHER PUBLICATIONS

CN 111261687 A translation (Year: 2020).*
CN 106597727 translation (Year: 2017).*

*Primary Examiner* — James A Dudek
(74) *Attorney, Agent, or Firm* — Nathan & Associates; Menachem Nathan

(57) ABSTRACT

The present invention provides a display panel and a display module. The display panel includes a first substrate, a first electrode layer, a light control layer, a second electrode layer, and a second substrate. The light control layer includes a first liquid crystal and light blocking layers. When no voltage is applied to the light control layer, the first liquid crystal is configured as an atomized liquid crystal for scattering light. When a voltage is applied to the light control layer, the first liquid crystal is configured as a transparent liquid crystal, thereby effectively improving an anti-peep performance of the display panel.

19 Claims, 6 Drawing Sheets

(51) Int. Cl.
   *G02F 1/13* (2006.01)
   *G02F 1/1335* (2006.01)
   *G02F 1/1343* (2006.01)
   *G02F 1/1347* (2006.01)

(52) U.S. Cl.
   CPC .. *G02F 1/133512* (2013.01); *G02F 1/134309* (2013.01); *G02F 1/13476* (2013.01); *G02F 2201/50* (2013.01)

(56) References Cited

U.S. PATENT DOCUMENTS

| | | |
|---|---|---|
| 2019/0179074 A1 | 6/2019 | Choi et al. |
| 2020/0073158 A1* | 3/2020 | Li .................. G02F 1/1337 |
| 2021/0271296 A1* | 9/2021 | Liu ................. G02B 5/3025 |

FOREIGN PATENT DOCUMENTS

| CN | 106597727 A | * | 4/2017 | |
| CN | 106597727 A | | 4/2017 | |
| CN | 106647048 A | | 5/2017 | |
| CN | 110032009 A | | 7/2019 | |
| CN | 111261687 A | * | 6/2020 | ....... G02F 1/134309 |
| CN | 111261687 A | | 6/2020 | |
| CN | 111323963 A | | 6/2020 | |

\* cited by examiner

DISPLAY PANEL AND DISPLAY MODULE

FIELD OF INVENTION

The present invention relates to the technical field of display panel manufacturing, and in particular to a display panel and a display module.

BACKGROUND OF INVENTION

In recent years, with continuous development of display technology, applications of liquid crystal display devices in various industries have become wider, and functions of display panels have also been rapidly developed. Meanwhile, with an improvement of people's awareness of information security, anti-peep display panels are valued by people.

Existing liquid crystal display devices have a wide viewing angle. However, under some circumstances, they are unable to meet people's needs for information security. The anti-peep display panel can effectively prevent an observer from acquiring screen information in a certain visual area, thereby protecting the security of displayed information. In existing anti-peep technologies, there are often an external anti-peep film solution and a backlight solution. In the external anti-peep film solution, a louver-type microstructure is externally attached to a liquid crystal display screen to limit a large-angle light emission, so as to achieve a narrow viewing angle display. In the backlight solution, by adding a light control film and a polymer dispersed liquid crystal to a backlight module, a viewing angle of the display can be narrowed, and a purpose of preventing peeping can finally be achieved. In addition, by adding a third electrode on a color film side of a display liquid crystal cell to achieve anti-peeping, the third electrode controls a deflection state of liquid crystal molecules to control a degree of light leakage in a dark state of a large viewing angle, and finally realize switching between wide and narrow viewing angles, thereby achieving a purpose of protecting screen information. However, all of the above-mentioned anti-peep technologies have defects. In the external anti-peep film technology, it is impossible to switch perspectives flexibly according to a change of user settings. The display screen in the backlight solution still has a certain amount of atomization in a clear state, which weakens an anti-peep effect of the panel. Moreover, in the technical solution of adding the third electrode, in the anti-peep mode, there are problems such as poor contrast of the screen, white edges appearing on the display screen, and poor anti-peep effect at wide viewing angles.

Therefore, it is necessary to propose solutions to the problems in the prior art.

In summary, in the existing anti-peep technology solutions for display screens, the anti-peep display screen cannot switch perspectives flexibly according to a change of user settings effectively, and when in use, the screen has a certain degree of atomization and problems such as poor contrast of the screen and poor display quality, which cause the display panel to not have a high display effect while protecting the information.

SUMMARY

In order to solve the above-mentioned problems, embodiments of the present invention provide a display panel and a display module, so as to solve the problems of the existing display panels. In anti-peep protection, the display panel can switch perspective flexibly according to user settings. At the same time, in the anti-peep protection, it can effectively protect information on the screen to prevent information leakage. Therefore, the anti-peep effect is good, and the display panel also has a high display quality.

The embodiments of the present invention provide a display panel to improve an anti-peep effect of an anti-peep display panel and ensure a display quality of the display panel.

To solve the above-mentioned technical problems, the technical solutions provided by the present invention are as follows:

In a first aspect of the embodiments of the present invention, a display panel is provided, and the display panel comprises:

a first substrate;
a first electrode layer disposed on the first substrate;
a second electrode layer disposed on a liquid crystal layer;
a second substrate disposed on the second electrode layer; and
a protective layer disposed on the second substrate,
the display panel further comprises a light control layer, the light control layer is disposed between the first electrode layer and the second electrode layer, the light control layer comprises a first liquid crystal and light blocking layers, the light blocking layers are disposed on a side of the light control layer close to the first electrode layer, when no voltage is applied to the light control layer, the first liquid crystal is configured as an atomized liquid crystal for scattering light, when a voltage is applied to the light control layer, the first liquid crystal is configured as a transparent liquid crystal, and the first liquid crystal comprises a polymer network liquid crystal material.

According to an embodiment of the present invention, polymer content in the polymer network liquid crystal material is less than 14%, a functionality of the polymer is greater than 1, and the polymer network liquid crystal material can form a network structure after curing.

According to an embodiment of the present invention, the light blocking layers are arranged in parallel and spaced apart in the light control layer.

According to an embodiment of the present invention, a material of the light blocking layers comprises chromium (Cr) or a material mixed by a black pigment and an acrylic resin.

According to an embodiment of the present invention, the light blocking layers are arranged in a grid shape in the light control layer.

According to a second aspect of the embodiments of the present invention, a display panel is provided, and the display panel comprises:

a first substrate;
a first electrode layer disposed on the first substrate;
a second electrode layer disposed on a liquid crystal layer; and
a second substrate disposed on the second electrode layer;
the display panel further comprises a light control layer, the light control layer is disposed between the first electrode layer and the second electrode layer, the light control layer comprises a first liquid crystal and light blocking layers, the light blocking layers are disposed on a side of the light control layer close to the first electrode layer, when no voltage is applied to the light control layer, the first liquid crystal is configured as an atomized liquid crystal for scattering light, when a voltage is applied to the light control layer, the first liquid crystal is configured as a transparent liquid crystal.

According to an embodiment of the present invention, the first liquid crystal comprises a polymer network liquid crystal material.

According to an embodiment of the present invention, polymer content in the polymer network liquid crystal material is less than 14%, a functionality of the polymer is greater than 1, and the polymer network liquid crystal material can form a network structure after curing.

According to an embodiment of the present invention, the light blocking layers are arranged in parallel and spaced apart in the light control layer.

According to an embodiment of the present invention, a material of the light blocking layers comprises chromium (Cr) or a material mixed by a black pigment and an acrylic resin.

According to an embodiment of the present invention, the light blocking layers are arranged in a grid shape in the light control layer.

According to an embodiment of the present invention, the display panel further comprises a protective layer disposed on the second substrate.

According to a third aspect of the embodiments of the present invention, a display module is further provided, the display module comprises a display panel, and the display panel comprises:

a first substrate;

a first electrode layer disposed on the first substrate;

a second electrode layer disposed on a liquid crystal layer; and a second substrate disposed on the second electrode layer;

the display panel further comprises a light control layer, the light control layer is disposed between the first electrode layer and the second electrode layer, the light control layer comprises a first liquid crystal and a light blocking layer, the light blocking layers are disposed on a side of the light control layer close to the first electrode layer, when no voltage is applied to the light control layer, the first liquid crystal is configured as an atomized liquid crystal for scattering light, when a voltage is applied to the light control layer, the first liquid crystal is configured as a transparent liquid crystal;

the display module further comprises:

a light guide plate;

a diffusion layer disposed on the light guide plate;

at least one anti-reflection layer disposed on the diffusion layer, wherein the second substrate is disposed on the anti-reflection layer, wherein the anti-reflection layer comprises second light blocking layers spaced apart.

According to an embodiment of the present invention, the second light blocking layers in the anti-reflection layer and the light blocking layers in the light control layer are arranged in a one-to-one correspondence.

According to an embodiment of the present invention, the second light blocking layers in the anti-reflection layer are oppositely disposed at a corresponding position between two adjacent light blocking layers in the light control layer.

According to an embodiment of the present invention, a side of the diffusion layer away from the anti-reflection layer is arranged in a zigzag structure, and a side of the light guide plate away from the anti-reflection layer is arranged in a convex-concave shape structure.

According to an embodiment of the present invention, the first liquid crystal comprises a polymer network liquid crystal material.

According to an embodiment of the present invention, polymer content in the polymer network liquid crystal material is less than 14%, a functionality of the polymer is greater than 1, and the polymer network liquid crystal material can form a network structure after curing.

According to an embodiment of the present invention, the light blocking layers are arranged in parallel and spaced apart in the light control layer.

According to an embodiment of the present invention, the light blocking layers are arranged in a grid shape in the light control layer.

In summary, the beneficial effects of the embodiments of the present invention are:

The embodiments of the present invention provide a display panel. A light control layer is disposed in the display panel, and a first liquid crystal and light blocking layers are disposed in the light control layer. Specifically, the first liquid crystal changes with voltage. When no voltage is applied to the light control layer, the first liquid crystal is an atomized liquid crystal. When light passes through the atomized liquid crystal, it will scatter in the first liquid crystal. At this point, the light is effectively controlled with the light blocking layers, thereby achieving a normal display. When a voltage is applied to the light control layer, the first liquid crystal becomes a transparent liquid crystal, and the display panel can display normally at this time. The display panel and the display module provided by the embodiments of the present invention can not only be applied in different working conditions, but also the display panel has good anti-peeping effect and high display quality.

DETAILED DESCRIPTION OF EMBODIMENTS

The following description of every embodiment with reference to the accompanying drawings is used to exemplify a specific embodiment which may be carried out in the present invention.

The display panel provided by the embodiments of the present invention is an anti-peep display panel, the anti-peep display panel can switch perspectives flexibly according to user settings, so as to achieve effective anti-peep protection performance. Thus anti-peep protection effect is good and display quality of the display panel is high.

Figure 1:
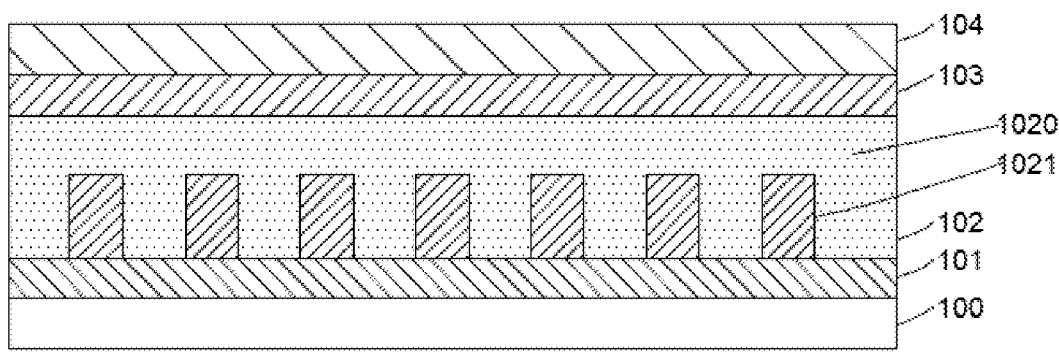
FIG. 1 is a schematic view of a film structure of an anti-peep display panel in accordance with an embodiment of the present invention.

Specifically, as shown in FIG. 1, FIG. 1 is a schematic view of a film structure of an anti-peep display panel in accordance with an embodiment of the present invention. The display panel comprises a first substrate 100, a first electrode layer 101, and a light control layer 102. Specifically, the first electrode layer 101 is disposed on the first substrate 100, and the light control layer 102 is disposed on the first electrode layer 101.

Figure 2:
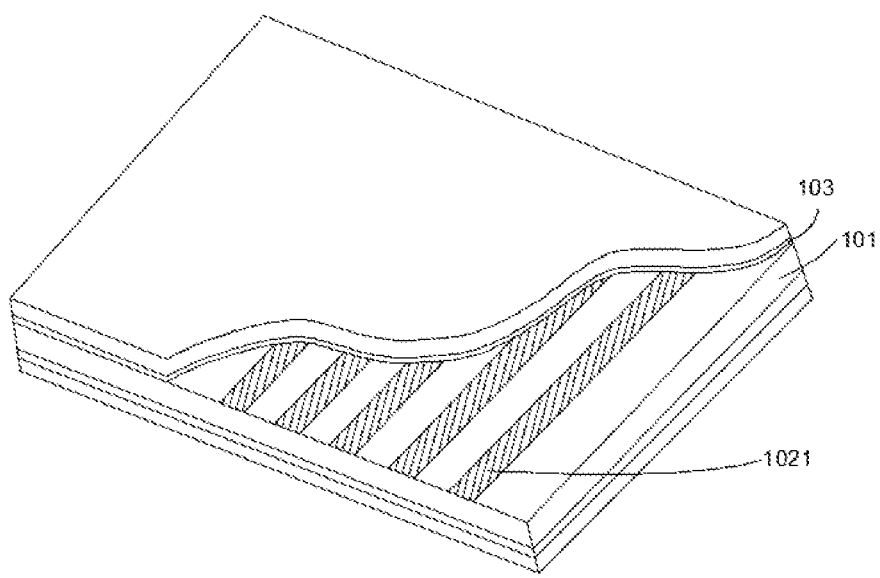
FIG. 2 is a schematic view of a planar structure of light blocking layers of the display panel in accordance with an embodiment of the present invention.

In this embodiment of the present invention, the light control layer 102 further comprises light blocking layers 1021 and a first liquid crystal 1020. As shown in FIG. 2, FIG. 2 is a schematic view of a planar structure of light blocking layers of a display panel in accordance with an embodiment of the present invention. The light blocking layer 1021 may be disposed in parallel and spaced apart on a side of the light control layer 102 close to the first electrode layer 101. At this point, a distance between two adjacent light blocking layers 1021 may be the same.

Furthermore, the light blocking layers 1021 provided in the embodiments of the present invention may be chromium (Cr) or a material mixed by a black pigment and an acrylic resin. The specific black pigments may be a material i.e. easily compatible and curable with acrylic resin, such as black ink, or other materials through which light cannot pass.

Since the light blocking layers 1021 provided in this embodiment of the present invention are made of a black opaque material, when light passes through adjacent light blocking layers 1021, the light cannot pass through two sides of a light blocking layer 1021 and propagate in a lateral direction. It can only propagate in an area defined between two adjacent light blocking layers 1021. Therefore, when the display panel is anti-peeping, visual angles of the display panel can be effectively controlled to ensure information security of the display panel during display.

Figure 3:
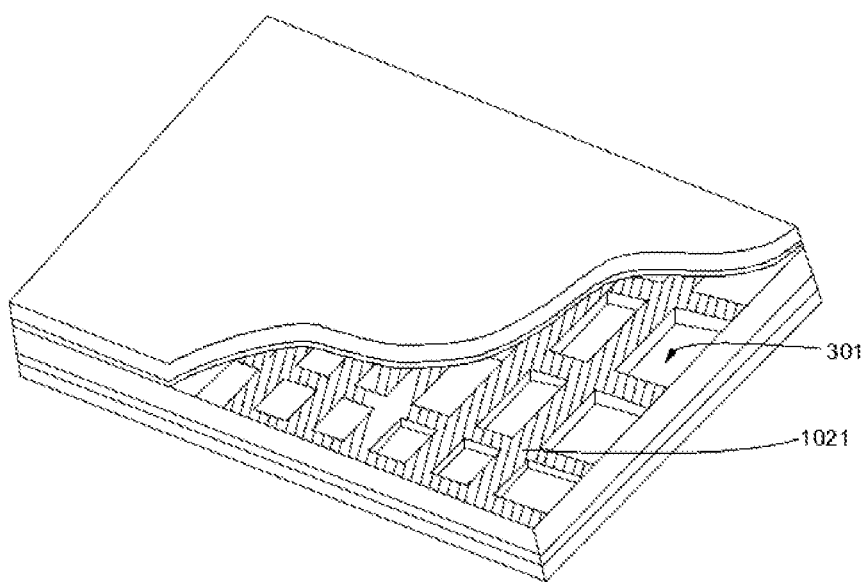
FIG. 3 is a schematic view of a planar structure of another light blocking layers of the display panel in accordance with an embodiments of the present invention.

As shown in FIG. 3, FIG. 3 is a schematic view of a planar structure of another light blocking layers of a display panel in accordance with an embodiment of the present invention. In combination with FIG. 2, in this embodiment of the present invention, at this point, the light blocking layers 1021 are arranged as a grid-shaped hollow structure 301 in the light control layer. In order to ensure that the display panel has better consistency when viewed from different angles, the hollow structures 301 can be arranged at equal intervals when arranged, and a hollow area of each hollow structure 301 has the same size, thereby ensuring an overall consistency of an internal structure of the display panel.

When light passes through the hollow area of each hollow structure 301, it will propagate in the hollow area, thereby ensuring a control of light propagation path and direction and achieving a purpose of controlling light viewing angles.

Furthermore, the first liquid crystal 1020 provided in the embodiments of the present invention may be a polymer network liquid crystal material, and the first liquid crystal 1020 is disposed inside the light control layer 102. A material of the first liquid crystal 1020 may be a polymer network liquid crystal material. Polymer content in the polymer network liquid crystal material is generally less than 14%. Meanwhile, a functionality of the polymer is greater than 1, and the polymer network liquid crystal material can form a network structure after curing. The polymer network liquid crystal material can be prepared through a phase separation process initiated by a polymerization between a liquid crystal monomer and a polymer, a phase separation process initiated by heat, and a phase separation process initiated by solvent volatilization, etc.

In the embodiments of the present invention, since the first liquid crystal 1020 is a polymer network liquid crystal material, the polymer network liquid crystal material has an arrangement consistent with an arrangement of the liquid crystal and a consistent refractive anisotropy. When a certain electric field is applied or removed, liquid crystal molecules with negative dielectric anisotropy in a center of the polymer network shift from a vertical alignment to an alignment which is parallel to a conductive substrate, while the polymer and the liquid crystal at the edge of the polymer network cannot change with the orientation of the electric field. Therefore, the refractive index of this portion does not change, and the first liquid crystal 1020 exhibits atomized characteristics.

When a film layer of the display panel is displaying, specifically, when no voltage is applied to the light control layer 102, i.e., there is no voltage difference between the first electrode layer 101 and a second electrode layer 103. At this point, the first liquid crystal 1020 behaves as an atomized liquid crystal, i.e., information in the display screen of the display panel can be observed from the outside at different viewing angles. Since there is no voltage, the material of the first liquid crystal 1020 provided in the embodiment of the present invention will not change accordingly, and thus the display panel can display various information normally. Meanwhile, the first liquid crystal 1020 provided in this embodiment of the present invention can be evenly distributed in the light control layer 102.

When light emitted from inside the display panel reaches the light control layer 102 through each film layer, since the first liquid crystal 1020 in the light control layer 102 is in the atomized state at this time, light will be scattered between the atomized liquid crystal molecules, and the scattering will make an exit angle of light larger, so as to control the visual angles of light.

Meanwhile, since the first liquid crystal 1020 is an atomized liquid crystal, a light transmittance of the light control layer 102 will be further changed. When performing anti-peep control, a state of the first liquid crystal 1020 can be changed by changing the voltage between the first electrode layer 101 and the second electrode layer 103.

In addition, the atomized first liquid crystal 1020 is combined with the light blocking layers 1021, which can further control incident light and also effectively control an exit angle of the incident light. Therefore, in this embodiment of the present invention, the first liquid crystal 1020 within the light control layer 102 provided in the embodiments of the present invention can switch perspectives flexibly according to a change of user settings.

Furthermore, when a voltage is applied between the first electrode layer 101 and the second electrode layer 103, at this point, a voltage difference is formed between the first electrode layer 101 and the second electrode layer 103, and then an electric field is formed in the light control layer 102, and the first liquid crystal 1020 will change under an effect of the electric field. Specifically, under the effect of the electric field, the liquid crystal and other substances in the atomized first liquid crystal 1020 will be re-arranged, and finally the first liquid crystal 1020 becomes transparent.

When light passes through the transparent first liquid crystal 1020 in the light control layer 102, the light will not produce a scattering effect. At this point, a propagation path and a propagation angle of the light are much smaller than a propagation path and a propagation angle of the light when the first liquid crystal in the atomized state. With the light blocking layers 1021 provided in this embodiment of the present invention, a strip structure arranged in parallel and spaced apart, or the light blocking layer 1021 arranged in a grid hollow structure, a degree of light control is further reduced, and finally control of visual angles is achieved, which has an effective anti-peep effect.

When the light blocking layer 1021 is a strip structure arranged in parallel and spaced apart, the purpose of viewing angle control in the horizontal direction can be achieved. When the light blocking layer 1021 is arranged in a grid structure, since light is restricted in all four directions, at this point, the purpose of controlling full-angle viewing angles of the light can be achieved.

Specifically, when controlling visual angles, precise control can be achieved by adjusting a height of the light blocking layers 1021 provided in the light control layer 102 and a distance between adjacent light blocking layers 1021. Specific parameters can be set according to an actual anti-peep situation.

In the embodiments of the present invention, film materials of the first electrode layer 101 and the second electrode layer 103 may be indium tin oxide film layers, and materials of the first substrate 100 and the second substrate 104 may be substrates formed of transparent materials, such as glass substrates.

Figure 4:
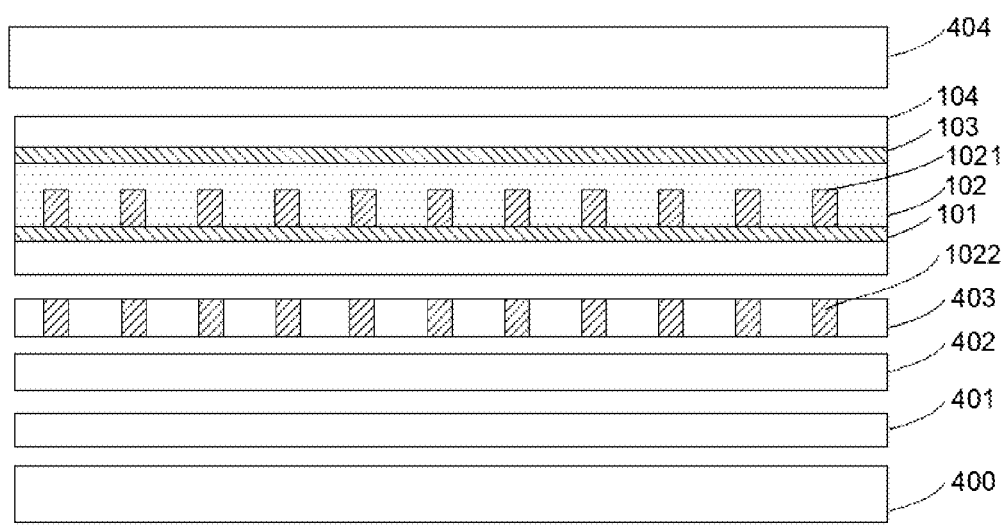
FIG. 4 is a schematic view of a structure of a display module in accordance with an embodiment of the present invention.

As shown in FIG. 4, FIG. 4 is a schematic view of a structure of a display module in accordance with an embodiment of the present invention. The display module comprises a light guide plate 400, a diffusion layer 401, a lens layer 402, and an anti-reflection layer 403. The diffusion layer 401 is disposed on the light guide plate 400, the lens layer 402 is disposed on the diffusion layer 401, and the anti-reflection layer 403 is disposed on the lens layer 402.

Meanwhile, the display module further comprises a first electrode layer 101, a light control layer 102, and a second electrode layer 103. A plurality of light blocking layers 1021 are disposed in the light control layer 102. Meanwhile, the display panel further comprises a protective layer 404. The protective layer 404 is disposed on the second substrate 104. The setting of the above-mentioned film structure is the same as the corresponding film structure in the display panel provided in the embodiments of the present invention and will not be described in detail herein.

Furthermore, in this embodiment of the present invention, second light blocking layers 1022 are further disposed in the anti-reflection layer 403, and the second light blocking layers 1022 can be arranged spaced apart in the anti-reflection layer 403, and distances between two adjacent second light blocking layers 1022 may be the same.

Meanwhile, when the anti-reflection layer 403 is disposed, the second light blocking layers 1022 in the anti-reflection layer 403 and the light blocking layers 1021 in the light control layer 102 are arranged in a one-to-one correspondence, i.e., an orthographic projection of the Fast-light blocking layers 1021 on the anti-reflection layer 403 coincides with the second light blocking layer 1022. As such, when light enters the anti-reflection layer 403, it will exit from an interval formed by the second light blocking layers 1022 and enter the light control layer 102 again. Further, the light blocking layers 1021 in the light control layer 102 and the first liquid crystal work together to effectively control the light and effectively improve the anti-peep effect and performance of the display panel.

Furthermore, when the second light blocking layers 1022 in the anti-reflection layer 403 is disposed, a number of the second light blocking layers 1022 can be changed so that the number of the second light blocking layers 1022 is less than the corresponding number of the light blocking layers 1021. Preferably, in the anti-reflection layer 403, a second light blocking layer 1022 is disposed following every other light blocking layer 1021 at positions corresponding to the first light blocking layers 1021, so as to improve the intensity of light incident from the anti-reflection layer 403, and improve the display quality of the display panel.

Figure 5:
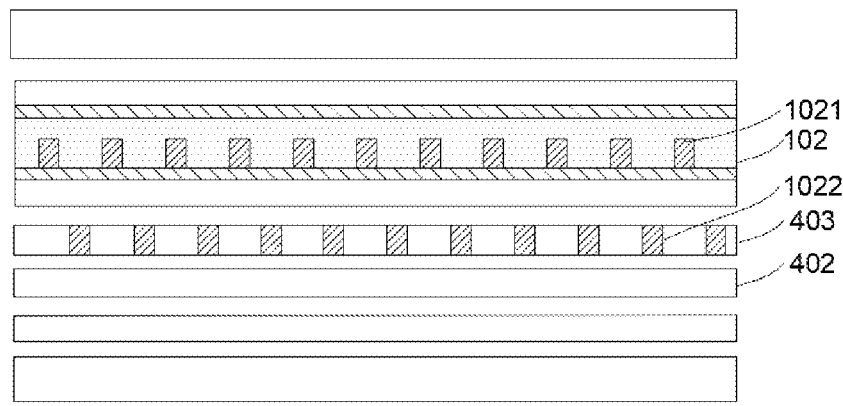
FIG. 5 is a schematic view of a structure of another display module in accordance with an embodiment of the present invention.

As shown in FIG. 5, FIG. 5 is a schematic view of a structure of another display module in accordance with an embodiment of the present invention. In combination with FIG. 4, in this embodiment of the present invention, when the second light blocking layers 1022 are disposed in the anti-reflection layer 403, the second light blocking layers 1022 in the anti-reflection layer 403 are correspondingly disposed at corresponding positions between two adjacent light blocking layers 1021 in the light control layer 102. At this point, a projection of the light blocking layers 1021 in the anti-reflection layer 403 does not overlap the second light blocking layers 1022. As such, the incident light is further controlled to improve the anti-peep effect of the display module.

Figure 6:
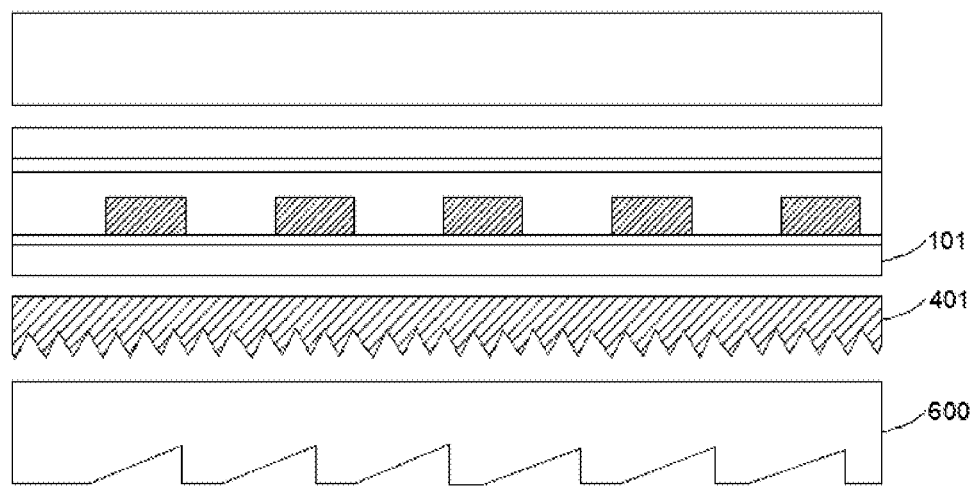
FIG. 6 is a schematic view of a film structure of a lens layer in accordance with an embodiment of the present invention.

As shown in FIG. 6, FIG. 6 is a schematic view of a film structure of a lens layer in accordance with an embodiment of the present invention. In order to further increase the incident angle of light and improve viewing angles of the display panel, a side of the diffusion layer 401 away from the first substrate 101 or a side of the anti-reflection layer is set in a zigzag structure, so that when light reaches the zigzag surface of the diffusion layer 401, it can be reflected or refracted multiple times, thereby increasing light entering the diffusion layer 401 and improving the display quality.

Preferably, as shown in FIG. 6, when the structure of a light guide plate 600 in this embodiment of the present invention is set, a side of the light guide plate 600 away from the anti-reflection layer is set as a convex-concave structure to ensure that more light enters the light guide plate 600. Finally, more light enters the display panel, which improves the display quality and anti-peep effect of the display panel.

Furthermore, an embodiment of the present invention further provides a display device, and the display device comprises the display module provided in the embodiments of the present invention.

The above describes in detail a display panel and a display module provided by the embodiments of the present invention. Specific examples are used herein to illustrate the principles and implementations of the present invention. The description of the above embodiments is only used to help understanding the technical solutions of the present invention and its core concept. Those skilled in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A display panel, comprising:
   a first substrate;
   a first electrode layer disposed on the first substrate;
   a second electrode layer disposed on a liquid crystal layer;
   a second substrate disposed on the second electrode layer; and
   a protective layer disposed on the second substrate,
   wherein the display panel further comprises a light control layer, the light control layer is disposed between the first electrode layer and the second electrode layer, the light control layer comprises a first liquid crystal and light blocking layers, and the light blocking layers are disposed on a side of the light control layer close to the first electrode layer; and when no voltage is applied to the light control layer, the first liquid crystal is configured as an atomized liquid crystal for scattering light, and when a voltage is applied to the light control layer, the first liquid crystal is configured as a transparent liquid crystal, and the first liquid crystal comprises a polymer network liquid crystal material,
wherein the display panel further comprises:
a light guide plate;
a diffusion layer disposed on the light guide plate;
at least one anti-reflection layer disposed on the diffusion layer, wherein the second substrate is disposed on the anti-reflection layer,
wherein a side of the diffusion layer away from the anti-reflection layer is arranged in a zigzag structure, and a side of the light guide plate away from the anti-reflection layer is arranged in a convex-concave shape structure.

2. The display panel as claimed in claim 1, wherein polymer content in the polymer network liquid crystal material is less than 14%, a functionality of the polymer is greater than 1, and the polymer network liquid crystal material forms a network structure after curing.

3. The display panel as claimed in claim 1, wherein the light blocking layers are arranged in parallel and spaced apart in the light control layer.

4. The display panel as claimed in claim 1, wherein a material of the light blocking layers comprises chromium (Cr) or a material mixed by a black pigment and an acrylic resin.

5. The display panel as claimed in claim 1, wherein the light blocking layers are arranged in a grid shape in the light control layer.

6. A display panel, comprising:
a first substrate;
a first electrode layer disposed on the first substrate;
a second electrode layer disposed on a liquid crystal layer; and
a second substrate disposed on the second electrode layer;
the display panel further comprises a light control layer, the light control layer is disposed between the first electrode layer and the second electrode layer, the light control layer comprises a first liquid crystal and light blocking layers, and the light blocking layers are disposed on a side of the light control layer close to the first electrode layer; and
when no voltage is applied to the light control layer, the first liquid crystal is configured as an atomized liquid crystal for scattering light, and when a voltage is applied to the light control layer, the first liquid crystal is configured as a transparent liquid crystal,
wherein the display panel further comprises:
a light guide plate;
a diffusion layer disposed on the light guide plate;
at least one anti-reflection layer disposed on the diffusion layer, wherein the second substrate is disposed on the anti-reflection layer,
wherein a side of the diffusion layer away from the anti-reflection layer is arranged in a zigzag structure, and a side of the light guide plate away from the anti-reflection layer is arranged in a convex-concave shape structure.

7. The display panel as claimed in claim 6, wherein the first liquid crystal comprises a polymer network liquid crystal material.

8. The display panel as claimed in claim 7, wherein polymer content in the polymer network liquid crystal material is less than 14%, a functionality of the polymer is greater than 1, and the polymer network liquid crystal material forms a network structure after curing.

9. The display panel as claimed in claim 6, wherein the light blocking layers are arranged in parallel and spaced apart in the light control layer.

10. The display panel as claimed in claim 6, wherein a material of the light blocking layers comprises chromium (Cr) or a material mixed by a black pigment and an acrylic resin.

11. The display panel as claimed in claim 6, wherein the light blocking layers are arranged in a grid shape in the light control layer.

12. The display panel as claimed in claim 6, wherein the display panel further comprises a protective layer disposed on the second substrate.

13. A display module comprising a display panel, wherein the display panel comprises:
a first substrate;
a first electrode layer disposed on the first substrate;
a second electrode layer disposed on a liquid crystal layer; and
a second substrate disposed on the second electrode layer;
the display panel further comprises a light control layer, the light control layer is disposed between the first electrode layer and the second electrode layer, the light control layer comprises a first liquid crystal and a light blocking layer, and the light blocking layers are disposed on a side of the light control layer close to the first electrode layer;
when no voltage is applied to the light control layer, the first liquid crystal is configured as an atomized liquid crystal for scattering light, and when a voltage is applied to the light control layer, the first liquid crystal is configured as a transparent liquid crystal; and
the display module further comprises:
a light guide plate;
a diffusion layer disposed on the light guide plate;
at least one anti-reflection layer disposed on the diffusion layer, wherein the second substrate is disposed on the anti-reflection layer,
wherein the anti-reflection layer comprises second light blocking layers spaced apart,
wherein a side of the diffusion layer away from the anti-reflection layer is arranged in a zigzag structure, and a side of the light guide plate away from the anti-reflection layer is arranged in a convex-concave shape structure.

14. The display module as claimed in claim 13, wherein the second light blocking layers in the anti-reflection layer and the light blocking layers in the light control layer are arranged in a one-to-one correspondence.

15. The display module as claimed in claim 13, wherein the second light blocking layers in the anti-reflection layer are oppositely disposed at a corresponding position between two adjacent light blocking layers in the light control layer.

16. The display module as claimed in claim 13, wherein the first liquid crystal comprises a polymer network liquid crystal material.

17. The display module as claimed in claim 16, wherein polymer content in the polymer network liquid crystal material is less than 14%, a functionality of the polymer is greater than 1, and the polymer network liquid crystal material forms a network structure after curing.

18. The display module as claimed in claim 13, wherein the light blocking layers are arranged in parallel and spaced apart in the light control layer.

19. The display module as claimed in claim 13, wherein the light blocking layers are arranged in a grid shape in the light control layer.

* * * * *